(12) United States Patent
Hawkins

(10) Patent No.: US 8,515,873 B2
(45) Date of Patent: Aug. 20, 2013

(54) WIC CHECK PROCESSING WITH VENDOR NUMBER OVERLAY SYSTEM AND METHOD

(75) Inventor: Kari B. Hawkins, Medicine Lake, MN (US)

(73) Assignee: Solutran, Minneapolis, MN (US)

( * ) Notice: Subject to any disclaimer, the term of this patent is extended or adjusted under 35 U.S.C. 154(b) by 0 days.

(21) Appl. No.: 13/090,915

(22) Filed: Apr. 20, 2011

(65) Prior Publication Data
US 2012/0101947 A1    Apr. 26, 2012

Related U.S. Application Data

(63) Continuation-in-part of application No. 12/387,131, filed on Feb. 26, 2009, now Pat. No. 8,301,567, which is a continuation-in-part of application No. 12/380,300, filed on Feb. 26, 2009, and a continuation-in-part of application No. 12/317,200, filed on Dec. 20, 2008, now Pat. No. 8,126,808, and a continuation-in-part of application No. 12/283,524, filed on Sep. 12, 2008, now Pat. No. 8,126,807, said application No. 12/317,200 is a continuation-in-part of application No. 11/699,776, filed on Jan. 30, 2007, now Pat. No. 8,311,945.

(60) Provisional application No. 60/763,417, filed on Jan. 30, 2006.

(51) Int. Cl.
*G06Q 40/00* (2012.01)

(52) U.S. Cl.
USPC .................................. 705/45; 235/379

(58) Field of Classification Search
USPC ................. 705/35–45; 235/379, 380
See application file for complete search history.

(56) References Cited

U.S. PATENT DOCUMENTS

| | | | |
|---|---|---|---|
| 5,265,007 A | 11/1993 | Barnhard et al. | |
| 5,583,759 A | 12/1996 | Geer | |
| 5,717,868 A | 2/1998 | James | |
| 5,854,475 A * | 12/1998 | Goodwin, III | 235/383 |
| 5,910,988 A | 6/1999 | Ballard | |
| 5,930,778 A | 7/1999 | Geer | |
| 6,032,137 A | 2/2000 | Ballard | |
| 6,644,546 B2 | 11/2003 | George et al. | |
| 6,816,608 B2 | 11/2004 | Cato | |
| 7,386,509 B1 | 6/2008 | Swift et al. | |

(Continued)

OTHER PUBLICATIONS

"Source Technologies Proves Process Improvement and Security Enhancements for Federal WIC Program; Program Members Receive Quicker Service and Fewer Distribution Errors on Benefits", Business Wire. New York: Dec. 20, 2005, pp. 1-2.*

(Continued)

*Primary Examiner* — Mohammad Z Shaikh
(74) *Attorney, Agent, or Firm* — Beck & Tysver PLLC

(57) ABSTRACT

A system and method of processing paper checks that divides into two independent paths the processing of a data file representing a check and the digital image of the check. The data files and image files are separated both in time and in space. The digital image files are deposited as an image or substitute check if deemed ACH ineligible through image exchange. WIC checks are handled through image exchange. Vendor identifiers required for WIC processing are added to the check after scanning. The system identifies the state of the check and the particular store accepting the check in order to determine where to place the overlay and which vendor identifier to use.

6 Claims, 7 Drawing Sheets

(56) References Cited

U.S. PATENT DOCUMENTS

| | | | |
|---|---|---|---|
| 7,447,347 B2 | 11/2008 | Weber | |
| 7,503,486 B2 | 3/2009 | Ahles et al. | |
| 7,520,420 B2 | 4/2009 | Phillips et al. | |
| 7,548,641 B2* | 6/2009 | Gilson et al. | 382/137 |
| 7,959,069 B2 | 6/2011 | Phillips et al. | |
| 8,290,813 B2* | 10/2012 | Prorock | 705/14.26 |
| 2002/0174069 A1 | 11/2002 | LaBadie et al. | |
| 2004/0236692 A1 | 11/2004 | Sellen et al. | |
| 2005/0071283 A1 | 3/2005 | Randle et al. | |
| 2005/0108168 A1 | 5/2005 | Halpin et al. | |
| 2005/0131820 A1 | 6/2005 | Rodriguez et al. | |
| 2005/0160000 A1* | 7/2005 | Plourde | 705/14 |
| 2006/0047569 A1* | 3/2006 | Sulaiman | 705/14 |
| 2006/0074784 A1* | 4/2006 | Brown | 705/35 |
| 2006/0143077 A1* | 6/2006 | Prorock | 705/14 |
| 2006/0206435 A1* | 9/2006 | Hoblit et al. | 705/65 |
| 2007/0050292 A1 | 3/2007 | Yarbrough | |
| 2007/0130063 A1 | 6/2007 | Jindia et al. | |
| 2007/0175977 A1* | 8/2007 | Bauer et al. | 235/379 |
| 2007/0194102 A1 | 8/2007 | Cohen et al. | |
| 2007/0214086 A1 | 9/2007 | Homoki | |
| 2008/0162351 A1 | 7/2008 | LaBadie et al. | |

OTHER PUBLICATIONS

"Audit Report Food and Nutrition Service Special Supplemental Nutrition Program for Women, Infants and Children Administrative Costs-Oregon", US Department of Agriculture Office of Inspector General, Nov. 2005, pp. 1-11.*

"Source Technologies Provides Process Improvement and Security Enhancements for Federal WIC Program, Program Members Receive Quicker Service and Fewer Distribution Errors on Benefits", Business Wire. New York: Dec. 20, 2005. p. 1.*

"JPMorgan Chase to Replace Many of Arizona's State-Issued Checks with Debit Cards; New Law Requires Direct Deposit or Electronic Payment Cards to Access State-Administered Child Support Payments", Business Wire, Jul. 21, 2005, pp. 1-3.*

"Pennsylvania Women,Infants, and Children Program Chooses Ciber for Internet-Based Application", PR Newswire, Nov. 29, 2001, pp. 1-2.*

"The Food Stamp Program: Training Guide for Retailers", United States Department of Agriculture Food and Nutrition Service, Sep. 2005, pp. 1-28.*

Nov. 13, 2008 Office Action (U.S. Appl. No. 11/699,776).

Sep. 30, 2009 Office Action (U.S. Appl. No. 11/699,776).

Mar. 1, 2010 Office Action (U.S. Appl. No. 12/317,200).

May 5, 2011 Office Action (U.S. Appl. No. 12/283,524).

May 3, 2011 Office Action (U.S. Appl. No. 12/317,200).

Jun. 10, 2011 Office Action (U.S. Appl. No. 12/387,131).

Aug. 8, 2011 Office Action (U.S. Appl. No. 11/699,776).

Jun. 9, 2011 Office Action (U.S. Appl. No. 12/380,300).

Anonymous, "ARC Falls Under Two ICP Categories", Today. Boston: Feb. 2005, vol. 27, iss. 1; p. 35, 1 pgs.

Fest, Glen, "Check Conversion: Check and ACH Processing: Besting Both Worlds; NACHA's new back-office processing rules will push the conversion down the line and expand least-cost routing advantages", Bank Technology News, Jun. 1, 2006, v. 19, n 6, pp. 12-13.

Oehlsen, Nadia, "Merchants Tackle Two Fronts with ACH Check Conversion", Cards & Payments, Aug. 1, 2008, pp. 1-4.

Anonymous, "MACHA Approves Rules for ARC of Business Checks", Today, Boston: Dec. 2005, vol. 28, iss. 6; p. 9, 1 pgs.

"To ARC or Not to ARC", PBI-Item Processing Report, Jun. 17, 2004, pp. 1-3.

Feb. 16, 2012 Office Action (U.S. Appl. No. 12/380,300)—Our File 4307.

May 31, 2012 Office Action (U.S. Appl. No. 13/365,369)—Our File 4818.

* cited by examiner

Figure 5

| Sequence # | WIC ID # | Name of Participant | Package | Agency |
|---|---|---|---|---|
| 13220354 | 4458-4574 | Johnson, Martha | 1 | 4561 |

13220354 State Name and Address — Special Supplemental Nutrition Program for Women, Infants & Children (WIC)

| Qty | Size | Description |
|---|---|---|
| 2 | 12.9 Oz | Powder Enfamil Lipil |
| -- | -- | -- |
| -- | -- | -- |
| -- | -- | -- |
| -- | -- | -- |

| First Use Date | Last Use Date |
|---|---|
| Apr/23/11 | May/23/11 |

Maximum Value: $32.84

| Vendor Stamp | Actual Sale $ |
|---|---|
| 7693 | 30.00 |

Signature of Participant: *Martha Johnson*

| 13220354 | State Name and Address | Special Supplemental Nutrition Program for Women, Infants & Children (WIC) |
|---|---|---|

| Sequence # | WIC ID # | Name of Participant | Package | Agency |
|---|---|---|---|---|
| 13220354 | 4458-4574 | Johnson, Martha | 1 | 4561 |

| Qty | Size | Description |
|---|---|---|
| 2 | 12.9 Oz | Powder Enfamil Lipil |
| -- | -- | -- |
| -- | -- | -- |
| -- | -- | -- |
| -- | -- | -- |

| First Use Date | Last Use Date |
|---|---|
| Apr/23/11 | May/23/11 |

Maximum Value: $32.84

| Vendor Stamp | Actual Sale $ |
|---|---|
|  | 30.00 |

| Signature of Participant |
|---|
| *Martha Johnson* |

710

⑈1322035⑈  ⑈05221945 7⑈  458591⑈

720

| 13220354 | State Name and Address | Special Supplemental Nutrition Program for Women, Infants & Children (WIC) |
|---|---|---|

| Sequence # | WIC ID # | Name of Participant | Package | Agency |
|---|---|---|---|---|
| 13220354 | 4458-4574 | Johnson, Martha | 1 | 4561 |

| Qty | Size | Description |
|---|---|---|
| 2 | 12.9 Oz | Powder Enfamil Lipil |
| -- | -- | -- |
| -- | -- | -- |
| -- | -- | -- |
| -- | -- | -- |

| First Use Date | Last Use Date |
|---|---|
| Apr/23/11 | May/23/11 |

Maximum Value: $32.84

| Vendor Stamp | Actual Sale $ |
|---|---|
| 3691 | 30.00 |

| Signature of Participant |
|---|
| *Martha Johnson* |

710    730

⑈1322035⑈  ⑈05221945 7⑈  458591⑈

US 8,515,873 B2

WIC CHECK PROCESSING WITH VENDOR NUMBER OVERLAY SYSTEM AND METHOD

RELATED APPLICATIONS

This application is a continuation-in-part of U.S. patent application Ser. No. 12/387,131 (the '131 application), filed Apr. 28, 2009. The '131 application is a continuation-in-part of Ser. No. 12/380,300 (the '300 application), filed Feb. 26, 2009, a continuation-in-part of U.S. patent application Ser. No. 12/317,200 (the '200 application), filed Dec. 20, 2008, and a continuation-in-part of Ser. No. 12/283,524 (the '524 application), filed Sep. 12, 2008. The '300 application is itself a continuation-in-part of the '200 application and a continuation-in-part of the '524 application. The '200 application is a continuation-in-part of U.S. patent application Ser. No. 11/699,776 (the '776 application), filed Jan. 30, 2007. The '524 application is also a continuation-in-part of the '776 application. The '776 application in turn claims the benefit of U.S. Provisional Patent Application No. 60/763,417. All of the above referenced patent applications are incorporated herein in their entirety.

FIELD OF THE INVENTION

The present invention relates generally to a system and method of processing checks and check transactions, and more particularly to processing checks from the Special Supplemental Nutrition Program for Women, Infants and Children ("WIC") through image exchange.

SUMMARY OF THE INVENTION

The present invention provides a system and method for converting checks to debit entries by which data from the checks is captured at the point of purchase and this data is used to promptly process a deposit to the merchant's account via a third party payment processor (TPPP). Meanwhile, the paper checks collected by the merchant are physically transported from the merchant's place of business to another location for scanning and image capture. Each check image is stored in association with its MICR (Magnetic Ink Character Recognition) line and indexed for future retrieval purposes. The TPPP receives data files from the merchant with the MICR and amount information; the TPPP receives the physical items for scanning and imaging. The TPPP executes a matching operation between the image files and the data files, matching image files with data files based on the MICR, amount, and auxiliary information. Routines are provided for handling image files with no matching data file, data files with no matching image files, and image and data files that find a MICR match but include some discrepancy in their data (e.g. amounts do not match). The non-ACH items that find a successful match, are rendered via image exchange for settlement.

With this system and method of processing checks, the data file is used to promptly process the transaction (and send a credit to the merchant's account) through a third party payment processor. In other words, the third party payment processor can initiate the credit to the merchant's account before the image of the check is matched up to the data file, or perhaps even before the image of the check is made for ACH eligible items (i.e. first-party consumer checks and business checks that do not contain an auxiliary on-us field). In this manner, the third party payment processor can provide the merchant with improved funds availability, while still providing for the storage of the image of the check, and destruction, as required by rules and regulations governing check processing.

In typical practice, many merchants have more than one location, and the system and method provide for service to more than one location of a merchant. Further, the system and method provide for service to more than one merchant. The system and method for processing check transactions is generally automated to allow processing of a high volume of check transactions from a number of merchants and to accommodate multiple locations of the merchant(s).

Checks from the Special Supplemental Nutrition Program for Women, Infants and Children (or "WIC") are also handled through the system. WIC checks are non-ACH checks, and are therefore handled through image exchange. The WIC program requires that vendor identifiers be added to the checks by the store accepting the check. If the vendor identifier is not found on the check at the proper location, the check will not be processed and will instead be returned. A process is set forth below in which vendor identifiers required for WIC processing are added to the check after scanning. The system identifies the state of the check and the store ID in order to determine where to place the identifier and which vendor identifier to use.

BRIEF DESCRIPTION OF THE DRAWINGS

FIG. 5 is a plan drawing of the front face of a WIC check.

FIG. 7 shows a WIC check before and after processing by the method of FIG. 6.

DETAILED DESCRIPTION OF THE INVENTION

Basic Method

Figure 1:
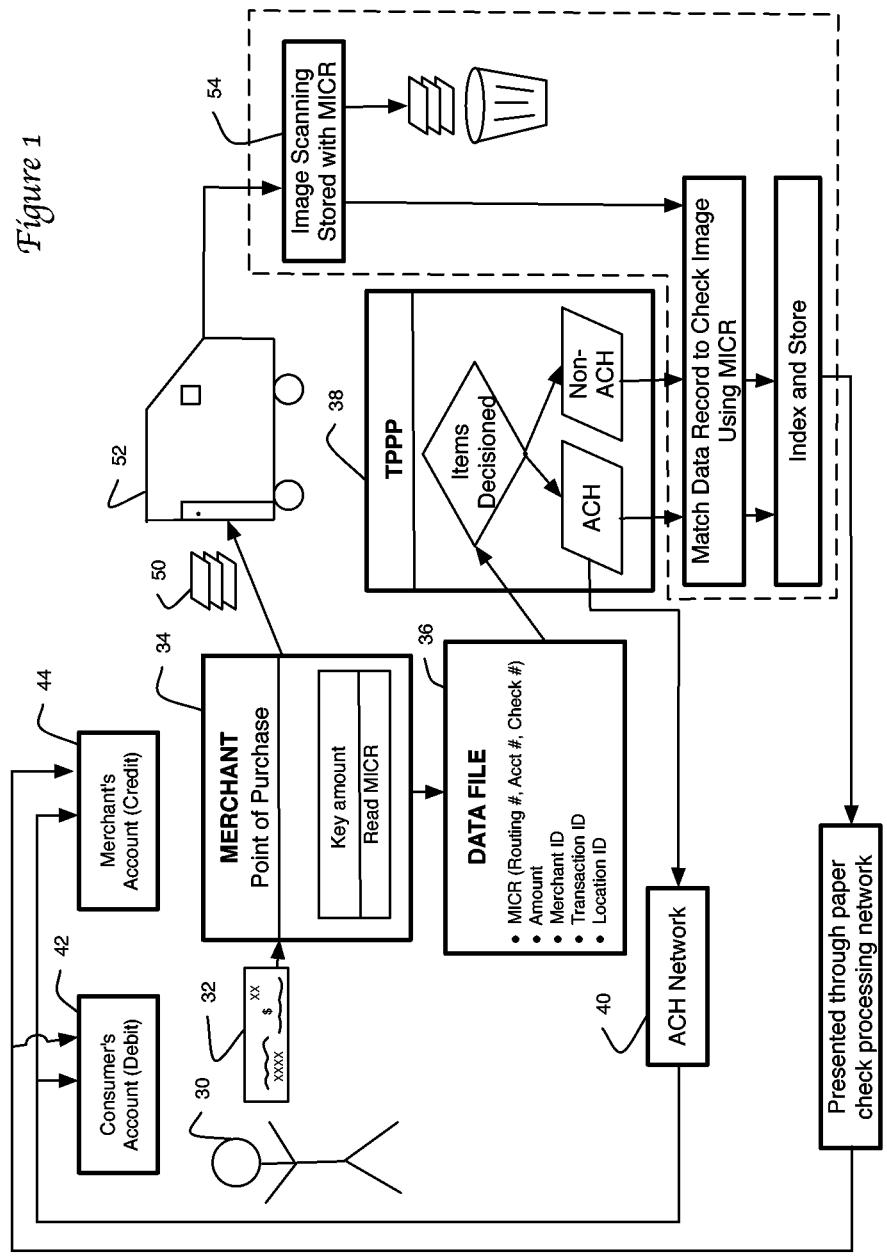
FIG. 1 is a is a schematic representation of a system and method for processing checks that entails transferring check data independently of a check image, and later connecting check images with their respective check data.
Figure 2:
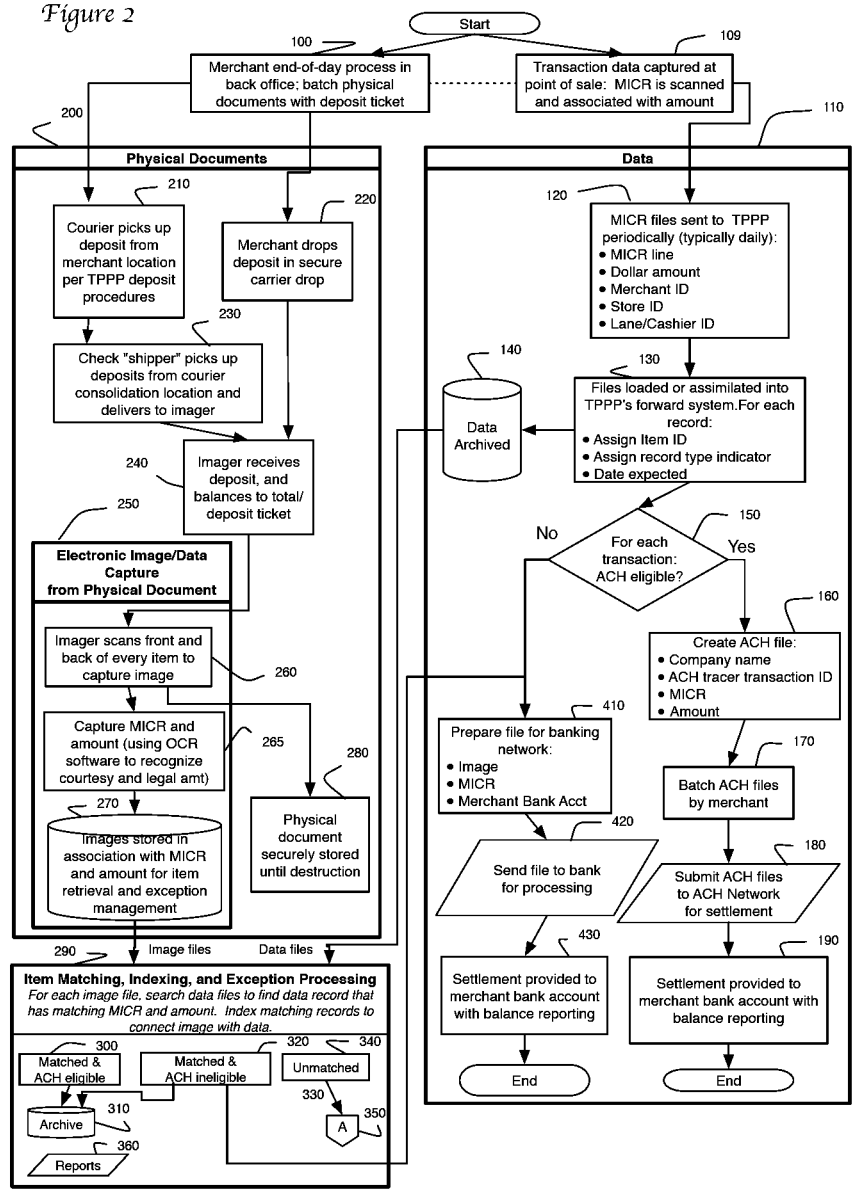
FIG. 2 is a flow chart showing the system and method of FIG. 1, with additional details shown regarding processing of exceptions.

FIG. 1 a system and method of processing checks by which the physical checks and their data files are initially (when they leave the merchant) separated. FIG. 1 depicts the system generally and conceptually, while FIG. 2 depicts the process, or portions of the process, with greater detail. Ultimately, the data files are matched up to the image files for reconciliation. More specifically, a consumer 30 pays a merchant with a check 32. At the merchant's point of purchase 34, the cashier keys in the amount of the purchase, or applies amount captured at POS, and passes the check through a MICR reader that reads the MICR line of the check and converts the MICR information to digital form. The MICR reader communicates directly or indirectly with the POS device that captures the amount, creating a digital record for each check transaction.

Periodically (typically daily), the merchant sends a data file 36 to a third party payment processor 38, reflecting a batch of such check transactions that have occurred during the period. More specifically, the merchant computer or server transfers the POS data file 36 to a TPPP computer or server over a computer network via a pre-defined file transfer protocol. The data file 36 contains at least the following information about each transaction: the MICR information (routing number, account number, and check number) and the amount. The data file 36 also includes an identifier for the merchant, location identifier, and a transaction identifier, with at least one of these identifiers being unique or with some combination of these identifiers being unique across the system that typically involves multiple merchants, each with multiple locations and with multiple transactions being processed within the reporting period.

The TPPP decisions the received data files, determining which are eligible for processing through the Automated Clearing House (ACH) 40, and which are not. ACH transactions are passed through the ACH network for processing and appropriate debiting of the consumer's account 42 and the crediting the merchant's account 44, respectively. More specifically, the TPPP computer sends data files reflecting the ACH transactions into the ACH network (i.e. the computers or servers on which the ACH network operates) via pre-defined file transfer protocol.

The merchant 34 periodically physically transfers a batch 50 of its paper checks to a secure courier (e.g. Brinks, UPS or U.S. postal service) 52 for physical delivery to a secure, high-volume scanning operation 54. This scanning service might be provided by the TPPP or may be provided by an independent company, typically in accord with a contractual relationship with the TPPP. The scanning operation 54 scans the checks, creating digital images of the checks that are stored in a digital file in association with their MICR information on the imager's server or computer. Physical checks are securely stored until they are destroyed, based on client specification.

Finally, the image files of the checks are matched to the data files representing the checks using the MICR line, thereby linking the images to the data files. This is achieved by assigning a unique number to each data record, and upon a successful match, indexing the data and image with the unique number for future access in retrieval needs. The MICR line, including the dollar amount, of a check is typically unique and this affords a one-to-one matching based on the MICR line.

This matching operation may be performed on a computer or server operated by the TPPP 38 or by the scanner 54 or by some other entity affiliated with or associated with the TPPP. This matching step is performed to identify any discrepancies between the data files and the image files which represent the checks so that these can be investigated. It will be appreciated that before the matching operation takes place, the matching computer must have access to both the POS data file and the image files created by the imager. When the matching step is performed by the TPPP, the imager transfers the image files from the imager computer to the TPPP computer over a computer network via a pre-defined file transfer protocol. When, alternatively, the matching step is performed by the imager, the TPPP transfers the POS data files from the TPPP computer to the imager computer over a computer network via a pre-defined file transfer protocol. When, as yet another alternative, the matching step is performed by a third party, the TPPP transfers its POS data files and the imager transfers its imager files to the matcher's computer over a computer network via a pre-defined file transfer protocol.

Detailed Process

Figure 3:
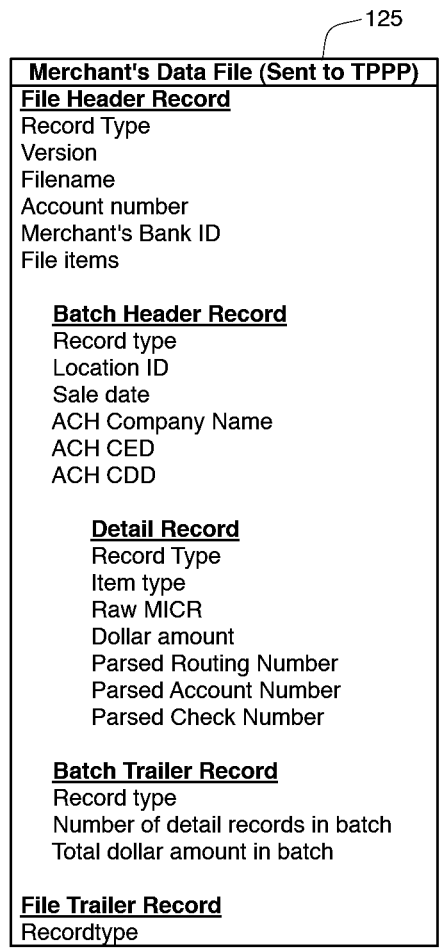
FIG. 3 is an illustration of the format of the data file sent from a merchant to a third party payment processor, according to the system and method of FIGS. 1 and 2.

FIG. 2 shows additional details of portions of the process depicted in FIG. 1 and illustrates the divergent flows for the data collected at the point of sale reflecting the check transactions (110) and for the physical checks and the images of those checks (200). At the point of sale, when a customer presents a transaction document to pay for goods or services, the merchant passes the document through a MICR reader to read the MICR line of the document. In addition, the merchant keys in or otherwise enters an amount for the transaction at the point of sale terminal. The amount and the MICR information are associated in a data file including a merchant identifier, a store identifier, and other various data associated with the transaction A data file containing all of the transactions for a period of time is sent, periodically, typically daily, from the merchant to a third party payment processor (step 120, FIG. 2). The structure of a merchant's data file 125 is illustrated in FIG. 3.

The fields identified in this file are as explained in more detail in the following table.

| File Header Record | |
| --- | --- |
| Record type | a predefined indicator indicating that the record following, until file trailer indication, is a file record |
| Version | predefined identifier, identifying a file format version |
| Filename | assigned by a merchant |
| Account Number | an identifier unique to the merchant, assigned by the TPPP |
| Merchant's Bank ID | a prescribed identifier for the merchant's bank |
| File items | a count of the number of detail records in this file transmission |
| A Batch Header Record | |
| Record type | a predefined indicator indicating that the record following, until batch trailer indication, is a batch record |
| Location | identifier for a store location |
| Sale Date | date of sale |
| ACH Company Name | Name of merchant company that will appear on consumer's bank statement (assigned by merchant) |
| ACH CED | An optional additional field for a merchant description that may appear on consumer's bank statement (assigned by the merchant) |
| ACH CDD | An optional additional field for merchant's discretionary data (assigned by merchant) |
| A Detail Record | |
| Record type | a predefined indicator indicating that the record following, until detail record trailer indicator or batch trailer record, is a detail record |
| Item type | indicates the type of document or transaction (e.g. business check, merchant payroll, non-standard check such as WIC, traveler's check, gift certificate check), personal check or Canadian |
| Amount | Numeric dollar/cents amount of transaction |
| Raw MICR | MICR line, consisting of digits, spaces and TOAD delimiters |
| Parsed RT | Parsed Routing Number, an optional field used when merchant's MICR reader parses the MICR to identify the routing number |
| Parsed ACCT | Parsed Account Number, an optional field used when merchant's MICR reader parses the MICR to identify the consumer's account number |
| Parsed CHECK | Parsed Check Number, an optional field used when merchant's MICR reader parses the MICR to identify the check number |
| A Batch Trailer Record | |
| Record type | a predefined indicator indicating a batch trailer record |
| Batch Items | number of data records in this batch |
| Total Amount | total dollar/cents amount of all detail records in this batch |
| A File Trailer Record | |
| Record type | a predefined indicator indicating a file trailer record |

This data file is sent via data connection, such as from one computer networked, one way or another, to another computer, via a predefined secure socket layer (SSL) file transfer protocol (FTP) As shown in FIG. 2, the payment processor loads or assimilates the merchant's file into its data system, assigning to each transaction record an item identifier, an identifier of the type of the record and calculates a date that the original item or image is expected for matching and archiving (step 130).

In the embodiment of the system and method illustrated in FIG. 2, a process (131) is followed to translate the MICR data that was included with the merchant file received by the TPPP into a desired predetermined format. This process is described in more detail in the parent applications that have been incorporated by reference. These records are then stored or archived (140), and processed accordingly as explained further below For each transaction record, the payment processor makes a determination as to whether the transaction is eligible for ACH processing or not (150). ACH eligible items include first party consumer checks and small-size corporate checks. (Corporate checks come in two sizes: a "small" size that is approximately the same size as a consumer check, and a larger size.) ACH ineligible items include money orders, WIC checks, travelers checks, large-size corporate checks, government checks, and others as identified under the NACHA rules and regulations. For those records that are ACH eligible, the payment processor creates an ACH file that includes the merchant's name, company entry description, ACH tracer identifier, the MICR line, and the amount of the transaction according to NACHA rules and regulations for ACH BOC processing and various other information. (160).

The payment processor, in typical commercial practice, will provide payment processing services to a number of merchants. On a periodic basis, typically daily, the processor will batch the records of the ACH eligible items by merchant (170), and will submit the batched records in an ACH file to the ACH Network for settlement (180). Thereafter, settlement to the merchant's bank account is made, followed by balance reporting, a confirmation file and a BAI file, typically on the next business day (190).

As noted above, the physical transaction documents that customers present at a point of sale follow a path (200) that is independent of the path (110) of the data reflecting the transaction. At step 100, a merchant gathers a number of transaction documents to be processed. The merchant will do this on a periodic basis, typically at the end of each day. The merchant bundles the transaction documents together and prepares a deposit ticket 201, shown in FIG. 5 to correspond to the bundled documents. The deposit ticket provides spaces for the merchant to summarize the bundled documents with the following data: the point-of-sale date 202, the total item count 203, the total deposit amount 204; an identifier for the store location 205 and an account identifier 206 for the account into which funds should be transferred. Optionally, a pre-printed form, or multiples thereof, are provided to merchants, with the store location 205 and merchant's bank account identifier 206 pre-printed. Further, optionally, the pre-printed form may include a MICR line 207, with a first portion 208 reflecting the location identifier and a second portion 209 reflecting the deposit account number. This MICR aids in later processing of the deposit slip by the check imager. It is a further option, to pre-print the merchant's name on the deposit tickets.

With reference to FIG. 2, the bundled transaction documents are delivered to an image processor. FIG. 2 reflects two examples of how the documents may be transported to the imager. A first option is for a courier to pick up the bundled documents from the merchant (210), and then for a check shipping agent to pick up the bundle from the courier or from the courier's consolidation location and deliver them to the imager (230). An alternate delivery method is for the merchant to drop the bundled documents into a secure carrier (e.g., U.S. Postal Service or United Parcel Service) mail drop (220) for delivery to the imager.

Figure 4:
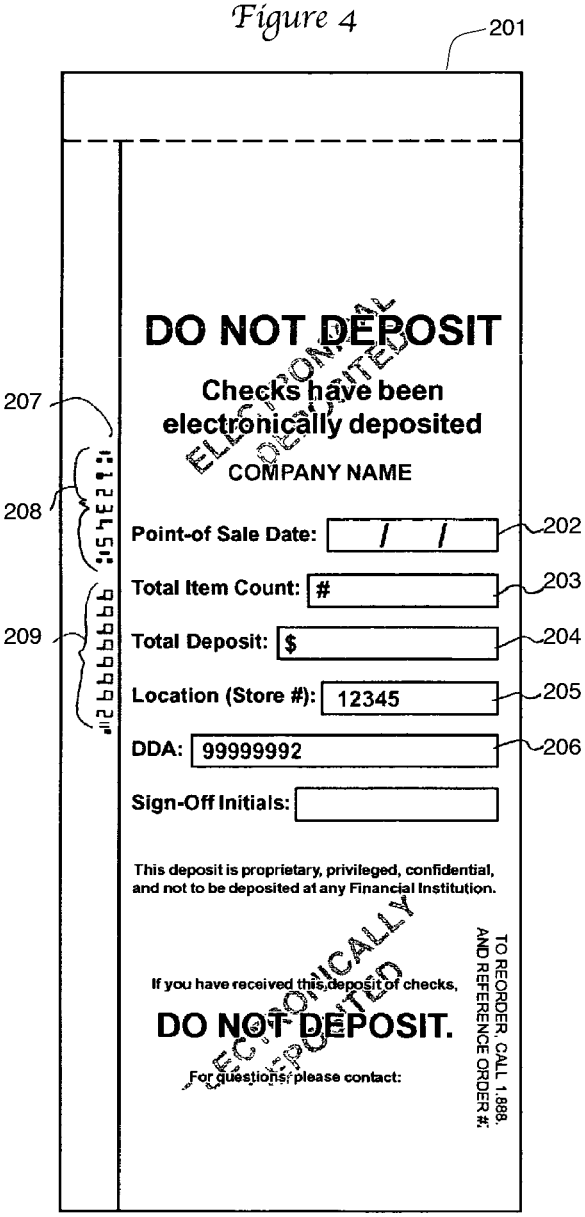
FIG. 4 is a deposit ticket used in the system and method of FIGS. 3 and 4.

The imager receives the deposited bundle of documents (or typically many deposited bundles of documents, each from one location of a merchant), scans the deposit ticket 201 and uses optical character recognition (OCR) software to interpret the information presented on the ticket 201. (Where a MICR line 207 has been pre-printed on the deposit ticket 201, it may be read by a MICR reader, then scans the ticket and applies OCR, linking the data obtained from the OCR with the MICR-obtained data.) The imager performs a balance to confirm that the amount indicated 204 on the deposit ticket 201, FIG. 4, matches the sum of the documents bundled or included therewith (240, FIG. 2).

As shown in FIG. 2, the imager then captures images of each document (250). More specifically, the imager scans the front and back of every item, captures the MICR and one of or both of the courtesy amount and legal amount using OCR software (265). The front and back images are stored in association with the MICR and amount for item retrieval and exception management (270). The merchant bank account identifier, taken from the deposit ticket that accompanied the batch of checks, is also stored in association with the image, MICR and amount. In accord with federal regulation, the original physical documents must be securely stored until items are destroyed (280).

Next, the process includes an attempt to match each image record to a data record (290), where the data record was generated through path 110 and archived in step 140, described above and includes the MICR information, the dollar amount and an item identifier, merchant bank account, point-of-sale date, and location identifier. More specifically, for each image record, the data files are searched to find a data record with a "matching" MICR and amount. (Alternatively, for each data file, the image files are searched to find a data record with a matching MICR and amount.) "Matching" records are indexed to connect the image with the data.

The system provides for the setting of parameters as to the degree to which the image record and a POS data record must be the same for them to be deemed "matches" or "matching". More specifically, the parameters determine how closely various fields must correlate for records to be deemed "matching". A probability as to likely matching may be determined and used to assist both the identified matches and to aid in processing unmatched records. Fields used in performing comparisons between image records and POS data records include: merchant bank account identifier; sale date; check dollar amount; MICR data (raw or parsed).

For each image record for an ACH eligible item for which a matching data record is found (300), the indexed record (containing the image and data) is archived (310). For each image record for an ACH ineligible item for which a matching data record is found (320), the indexed record (containing the image and data) is archived and an image exchange file is prepared (410) that includes the image, the MICR, the merchant's bank account number and other information as required for image exchange (330). This image exchange file is then transferred via the banking network (420).

Finally, for the ACH-ineligible matched items, settlement is provided (430) to the merchant's bank account based on availability and reported via balance reporting and a non-ACH deposit file, typically the next business day.

Special Processing for Predefined Categories of Records

The system and method may provide for special treatment or attention for records that fall into one or more predefined categories by virtue of having one or more characteristics (such as a predetermined value in one or more fields) and such special treatment may occur before or after transactions have been submitted for settlement. The special treatment may involve additional automated steps or may involve human operator intervention or management. Such "special" items are listed for one or more human operators, for example, by displaying a list of exceptions on a computer monitor in a graphical user interface. The operator will take whatever action is warranted by the exception and provide corresponding input to the system. As an example, one such category is high-dollar value items. The system may be set such that all transactions over a given dollar amount are subjected to special processing; a list of such transactions is provided to a human operator who performs investigative or research steps as prescribed by business practices to, for example, confirm their legitimacy, before completing their processing. Another example of a category that might be treated as "special" may be foreign items, such as checks drawn on the bank in a foreign country.

Exception Processing for Unmatched Records

Situations in which no "match" is found for an image record or for a data record during the matching step (290) after the date that the image from the paper document was expected, are subject to exception processing (350). These "exceptions" are yet another category of records that may be designated for special treatment. More specifically, exception records include those data records for which there is no matching image record and those image records for which there is no matching data record. Whether an image and data record "match" is determined by predetermined matching criteria. The criteria include the field or fields that must match and the sensitivity to deviance that is allowed. For example, in one embodiment, matching may be performed based on MICR; in another embodiment, matching may be performed based on MICR, transaction date, point of sale location identifier, and the direct deposit account identifier of the merchant. (The direct deposit account identifier of the merchant is added to each image record based on the deposit ticket that accompanied a batch of paper checks submitted for processing. In other words, through OCR, the merchant's account number that appears on the deposit ticket that accompanies a batch of paper checks is read, and this merchant's account number is then added to each image record for that batch of checks.) It is advantageous for the system to recognize as "matched" records that may not match exactly, but rather have some discrepancy in one or more of the designated fields. The system preferably recognizes a probability that two records match and will return a "match" where the probability of a match meets a predefined threshold probability. The process for handling exceptions is also described in more detail in the patent applications that have been incorporated by reference.

In a preferred method, the merchant's account can be credited at the initiation of the third party processor, based on the data file, before the image of the check is matched to the data file, or perhaps even before the check is imaged for ACH eligible items. ACH ineligible items are rendered processed through the Image Exchange Network upon a successful data and image match.

The system and method of identifying, sorting and prioritizing the exceptions is preferably automated or semi-automated through the use of dedicated software accessing database(s) running on computer(s) that returns its results (lists of exception records sorted and prioritized) to an operator(s) via a computer screen or on paper. Preferably, a screen display is linked to the software and databases(s) such that the operator can easily view details about each record and can update each record as warranted as a result of the operator's research. Exceptions may be identified and presented on a periodic schedule or upon operator demand.

Store Validation Control

Another opportunity for error can occur when a merchant is using this system for some but not all of its store locations. The transactions from a non-participating location may inadvertently be included in the transactions submitted in the merchant's MICR file.

To prevent these errant transactions from being processed, the system and method incorporates a control measure of checking that the "Store ID" in the transaction records from the MICR file sent to the TPPP (120) is a store for which the merchant has contracted services prior to processing the transactions. This control is facilitated by the use of a store table in which is stored a unique record for each store. Merchants assign a store number for each of their stores and provide this store number to customer service for the TPPP, and this merchant-assigned store number is then stored in a store table in association with an indication as to whether each store is supposed to have its transactions processed through this system and method. When the validation is performed, if the store number in the MICR file from the merchant does not match a pre-established store number in the TPPP system, i.e. if the store number is not associated with an indication that the store's transactions are to be processed by this system and method, then items carrying that store number will not be processed further and will be reported to the merchant. The remainder of items from stores that are to be processed by the system, are processed accordingly. In this way, it is not necessary to reject the merchant's file, or all the transaction in the merchant's file; rather, those transactions that belong in the system proceed without delay, while the errant transactions are not processed by the system.

WIC Processing

The Special Supplemental Nutrition Program for Women, Infants and Children or WIC program is designed to support the healthcare and nutrition of low-income pregnant women, breastfeeding women, and infants and children under the age of five. Participants in the program frequently receive a periodic check or voucher (referred to herein as a WIC check), although some states have moved away from checks and started to use an electronic benefit transfer (EBT) card.

States that use checks will deliver paper checks, such as check 500 shown in FIG. 5, to eligible receipts on a regular (e.g., monthly) basis. The front of the check displays the recipient's name 502 and identification number 504, the time period 506 for which the check is valid, and a list 510 of allowable items to be purchased with the check 500. The list 510 will indicate the quantity and maximum size of the item that may be purchased, as well as a description of that item. In FIG. 5, only one item is listed, although typically multiple items may be acquired with a single check 500. Even though multiple quantities or items may be listed at 510, the WIC recipient may elect to purchase only some of the items listed on the check 500. The check 500 also has an area 512 for the retailer to indicate the actual value of the purchase made by the recipient. Typically, this area 512 is filled out by hand at the time of sale. A maximum value 514 is sometimes printed on the check to indicate the maximum amount that the retailer will be able to receive for the sale of these items. The check 500 also has a signature box 516 for the recipient to sign the check at the time of purchase. At the bottom of the check 500 is the check's MICR line 518.

In order to help reduce frauds, most states require that the particular store location that is redeeming the check identify itself on the face of the check. This store identifier is placed in a particular location on the check 520. In FIG. 5, this location is labeled "vendor stamp," as the traditional method of placing the identifier on the check is through a hand stamp. In FIG. 5, the number 3691 has been stamped 522 within the vendor stamp area 520. If the identifier is missing from this location 520, the check will be returned unpaid. Furthermore, if the identifier is unreadable, such as may be the case with stamp 522, the check will also be returned unpaid. Unfortunately, many WIC checks 500 accepted by vendor locations that hand stamp their vendor identifier 522 are returned for failure to stamp, or for unreadable stamps.

Figure 6:
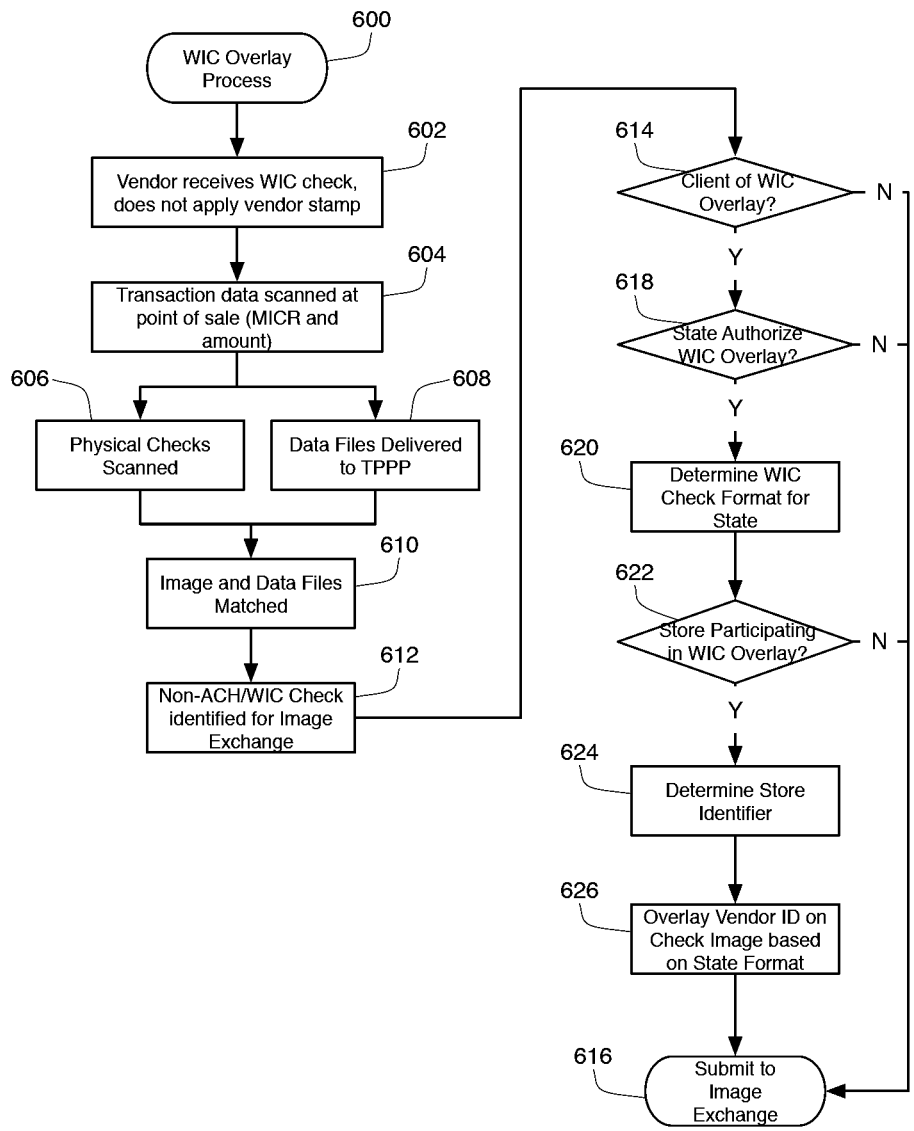
FIG. 6 is a flow chart showing the process for handling a WIC check.

This issue is cured in large part by the WIC overlay process 600 shown in FIG. 6. In this process 600, a vendor identifier is overlaid on top of the image of the WIC check that was acquired during the above-described processes. The overlay is merged into the check image, to create a new check image that can be submitted for processing via image exchange. The process 600 begins at step 602 by having certain vendors that receive WIC checks refrain from stamping the WIC check with their vendor identifier. The process then continues much as was described above. The transaction data is scanned at the point of sale, and a transaction data record including the MICR data and the amount of sale is created in step 604. The physical check is later submitted for scanning away from the vendor location in step 606, and the transaction data record is submitted for processing separate from the physical checks in step 608. At step 610, the image and data files are matched together using MICR data. The fact that the check in question is a WIC check indicates that it is not eligible for ACH processing, and must be submitted for processing via image exchange as shown at step 612.

Steps 604 through 612 of the WIC overlay process 600 are consistent with the process described above in connection with FIGS. 1 and 2. The process 600 potentially changes at step 614, where it is determined whether the company that submitted the WIC check has purchased a WIC overlay service from the third party payment processor. If not, then the vendor should have hand-stamped the check, and the payment processor simply processes the WIC check normally by submitting the check via image exchange at step 616. If step 614 determines that the company is a client of this service, step 618 next examines the location ID for the vendor that submitted the check, and from that location ID determines the state where the check was redeemed. The WIC overlay process is widely accepted by many states, but not yet all states. If the identified state does not yet allow WIC overlay on their checks, then the check must be handled without any overlay by submitting the original check image to image exchange at step 616. This situation may occur where a company with store locations in many states subscribes to the WIC overlay service. Some store locations are in states that accept WIC overlay, and in these states the vendor identifier 522 is not stamped on the check. However, store locations that are in states that do not accept WIC overlay must place the vendor identifier stamp 522 on the check at the point of sale. These checks are identified at step 618, and processed without any overlay at step 616.

If the WIC check is from a client of the WIC overlay service, and the originating state allows the overlay, step 620 then determines the WIC check format used by the state. As shown in FIG. 5, there is a specific box 520 on the check that must contain the store identifier. The physical location on the check of this box can vary from state to state. Consequently, step 620 determines where the vendor identifier box 520 is located on the check for this particular state.

The final test 622 before overlay occurs is whether this particular store location has opted out of WIC overlay. It has already been determined that the vendor company is a client of WIC overlay (step 614), and that the state allows this process (step 618). This final test 622 allows individual stores to opt out of the process if for some reason they prefer to hand stamp 522 their WIC checks 500. If so, processing again occurs using the original check image at step 616.

If the store has not opted out, step 624 determines the unique vendor identifier for the store location. This vendor identifier is then turned into a graphical image, sized appropriately, and then overlaid on top of the original WIC check image obtained in step 606. The two images are combined in step 626 to create a single check image that now has the appropriate vendor identifier in the correct location on the WIC check. This new image is then submitted to image exchange at step 616.

FIG. 7 shows a WIC check that has been altered by process 600. The original WIC check 700 was submitted by the vendor without any stamp within the identifier box 710. Transaction data for that check was delivered to the third party processor in step 608, and that check 700 was scanned at step 606. The data and image were matched at step 610. The check was identified as a WIC check that will take advantage of the WIC overlay service by steps 612-622. The location of the identifier box 710 was determined by examining the state where the check transaction took place, and the location identifier was used to determine the store's vendor identifier for the WIC program. Step 626 then merged the image created of the vendor identifier with the original check image, creating a modified check image 720. That check image 720 now contains the vendor id 730 inside the identifier box 710.

It should be noted that this system and method has been described in the context of a coordinated effort between merchants, a third party payment processor and a high-volume image scanning entity. The system may also function with additional or fewer parties and with other divisions of labor amongst the parties. For example, the matching, indexing and exception processing steps (290) are described as being done by the TPPP, but might instead be done by the imager or another entity. As another example, the third party payment processor might perform the scanning task. Such shifts in the division of labor would be facilitated with appropriate file transfer steps. Although an illustrative version of the device is shown, it should be clear that many modifications to the device may be made without departing from the scope of the invention.

Because alternative embodiments are possible, the scope of the present invention should not be limited to the exact details and structures described herein, but rather by the appended claims and equivalents.

What is claimed is:

1. A method for processing WIC (Women, Infants, and Children) checks, comprising:
   a) receiving at a computer transaction data relating to a transaction undertaken using a WIC check;
   b) receiving at the computer an image of the WIC check, the WIC check having a vendor identifier location with no vendor identifier information at that location;
   c) determining by the computer a vendor identifier for the WIC check based upon the transaction data;

d) determining by the computer a state within the United States for the transaction data and further determining the vendor identifier location on the WIC check for the determined state;

e) generating by the computer a graphical image of the vendor identifier;

f) creating a revised image of the WIC check by overlaying the graphical image of the vendor identifier over the image of the WIC check at the determined vendor identifier location; and g) submitting the revised image of the WIC check through image exchange.

2. The method of claim 1, further comprising receiving transaction data relating to a plurality of transactions undertaken using a plurality of WIC checks, and further receiving images of the plurality of WIC checks.

3. The method of claim 2, further comprising: h) identifying at least one of the plurality of WIC checks as a non-overlay check, the non-overlay check containing a vendor identifier on the check; and i) submitting the image of the non-overlay check through image exchange without creating a revised image of the non-overlay check.

4. The method of claim 3, wherein the step of identifying at least one of the plurality of WIC checks as a non-overlay check further comprises determining whether the vendor has purchased an overlay service.

5. The method of claim 3, wherein the step of identifying at least one of the plurality of WIC checks as a non-overlay check further comprises determining whether the state for the non-overlay check has not authorized the creation of a revised image.

6. The method of claim 2, wherein the plurality of WIC checks originate from a plurality of states, wherein at least two states have different vendor identifier locations.

* * * * *

UNITED STATES PATENT AND TRADEMARK OFFICE
CERTIFICATE OF CORRECTION

PATENT NO. : 8,515,873 B2
APPLICATION NO. : 13/090915
DATED : August 20, 2013
INVENTOR(S) : Kari B. Hawkins It is certified that error appears in the above-identified patent and that said Letters Patent is hereby corrected as shown below:

Title Page, item (63), Line 2,
(Related U.S. Application Data)
Delete "Feb. 26, 2009," and insert --Apr. 28, 2009,--, therefor.

Title Page 2
(Other Publications)
Column 2, Line 5,
Delete "Women,Infants," and insert --Women, Infants,--, therefor.

In the Specification
Column 5
Line 17
Delete "below" and insert --below.--, therefor.

Signed and Sealed this
First Day of July, 2014

Michelle K. Lee
*Deputy Director of the United States Patent and Trademark Office*